United States Patent [19]
Langos et al.

[11] Patent Number: 5,975,881
[45] Date of Patent: Nov. 2, 1999

[54] BLOW MOLDING MACHINE

[75] Inventors: Peter Langos; Wolfgang Hackner, both of St. Augustin; Wolfgang Hamlischer, Remscheid; Uwe Humrich, Weilerswist; Klaus Maier, Lohmar, all of Germany

[73] Assignee: Mauser-Werke GmbH, Brühl, Germany

[21] Appl. No.: 08/970,369

[22] Filed: Nov. 14, 1997

[30] Foreign Application Priority Data

Nov. 15, 1996 [DE] Germany ................ 296 19 781 U

[51] Int. Cl.⁶ ..................... B29C 33/20; B29C 49/56
[52] U.S. Cl. ............ 425/541; 425/450.1; 425/451.3; 425/451.9
[58] Field of Search ............... 425/450.1, 451.9, 425/541, 451.3

[56] References Cited

U.S. PATENT DOCUMENTS

| | | | |
|---|---|---|---|
| 3,465,387 | 9/1969 | Allard et al. ................ | 425/149 |
| 4,421,472 | 12/1983 | Martin, Jr. ................ | 425/450.1 |
| 4,594,067 | 6/1986 | Langos ................ | 425/451.9 |
| 4,998,873 | 3/1991 | Martin et al. ................ | 425/541 |
| 5,562,934 | 10/1996 | Langos et al. ................ | 425/541 |
| 5,645,873 | 7/1997 | Carter, Jr. ................ | 425/532 |
| 5,720,918 | 2/1998 | Wollschlager et al. ................ | 425/541 |
| 5,730,927 | 3/1998 | Rader et al. ................ | 425/451.9 |

FOREIGN PATENT DOCUMENTS

16 04 575  11/1975  Germany.

Primary Examiner—Robert Davis
Attorney, Agent, or Firm—Henry M. Feiereisen

[57] ABSTRACT

A blow molding machine, includes a base frame, a blow mold adapted for receiving a tubular parison and having a first mold support plate for support one mold half and a second mold support plate for support of another mold half. A transport unit is mounted to the base frame for so moving the first and second support plates that the mold halves are free from any direct, form-fitting coupling, with the transport unit including a first drive mechanism operatively connected to the first support plate and a second drive mechanism operatively connected to the second support plate and operating independent of the first drive mechanism. Secured to the support plates is a locking mechanism for pinching off the tubular parison and clamping the mold halves during the blow molding operation.

33 Claims, 6 Drawing Sheets

BLOW MOLDING MACHINE

BACKGROUND OF THE INVENTION

The present invention generally refers to a blowing molding machine, and in particular to a blow molding machine of a type having a base frame without tie bars for the production of blow-molded hollow plastic bodies, in which two blow mold halves for receiving the tubular parison are displaceable in horizontal direction by means of a transport device acting on the mold support plates or on the associated support columns carrying the mold support plates, and which has an independent separate locking system acting on the mold support plates and having its own drive for pinching off the tubular parison and for locking the blow mold halves during the blow molding operation.

German Patent No. 34 16 871 C3 discloses a blow molding machine of this type which is notable for its simple housing design without tie bars, in which the moving masses are considerably reduced compared with other conventional blow molding machines through decentralization of the movement systems and provision of a separately operating transport device and an independent locking system. Both movement systems are hydraulically driven. The blow mold halves are coupled to one another by way of a mechanical synchronizing device which includes a rack-and-pinion combination. An asynchronous actuation of the blow mold halves with respect to one another is not possible.

It is also known from German Pat. No. 16 04 575 to provide a blow molding machine with electrical drive of the blow mold halves or of the two support columns carrying the blow mold halves. The drive and synchronization of the blow mold halves is effected by way of four right-hand/left-hand rotatable threaded spindles having threads of different design (right-hand/left-hand threads) which are guided through threaded bores in the support columns.

The two support columns are coupled directly in positive-locking manner by way of these rotatable threaded spindles acting as a synchronizing device. The threaded spindles are driven by an electric motor by way of a toothed wheel/chain combination. As a result, the blow mold halves always execute synchronous opening and closing movements. This design does also not permit an asynchronous movement of the blow mold halves with respect to one another so that this type of blow molding machine is no longer able to meet current demands, since the translatory movement of the support columns is effected by way of track wheels on ground rails and a precise guidance of the blow mold parts in a manner free from play and free from tilting is not guaranteed. Such a blow molding machine cannot be constructed as a machine with two or more stations.

SUMMARY OF THE INVENTION

It is thus an object of the present invention to provide an improved blow molding machine, obviating the afore-stated drawbacks.

In particular, it is an object of the present invention to provide an improved blow molding machine without mechanical synchronizing device and direct mechanical coupling of the blow mold halves, and with blow mold halves that are capable of moving independently from one another.

It is another object of the present invention to provide an improved blow molding machine which is of extremely simple design and adaptable for use as a one station machine, two station machine or multi-station machine with a common transport drive (without a mechanical synchronizing device).

These objects and others which will become apparent hereinafter are attained in accordance with the present invention by so designing the blow mold halves that they are free from any direct, positive-locking coupling by means of a mechanical synchronizing device, and by providing a transport device which includes at least two separate identical drive units operating independent of one another, wherein each outer mold support plate or each outer support column carrying a mold support plate is equipped with at least one of these drive units.

As the blow mold halves are free from any direct, positive-locking coupling by way of a mechanical synchronizing device and as each outer mold support plate or each outer support column carrying a mold support plate is equipped with at least one of the drive units of the transport device, the blow mold halves can be moved or traversed independently of one another without direct positive locking to one another. This means that the position of the respective blow mold half can be determined by a separate control of the individual drive units alone. This is relevant in particular for the production of technical or asymmetrical plastic parts.

A synchronous movement of the blow mold halves can preferably be realized by a simple master/slave circuit. In this case, the master drive unit receives a movement pulse and the same movement pulse is transmitted from the master drive unit to the slave drive unit and is executed simultaneously by the latter. As a result, a synchronization of the movement sequences is absolutely ensured. In the case of an asynchronous movement of the blow mold halves, the different drive units receive different control commands.

According to another feature of the present invention, the drive unit may include a stationary coupling member fixed to the housing and a motor fastened to the respective outer support column and displaceable therewith, which motor is operatively connected directly to the stationary coupling member by way of a rotating engagement member.

Preferably, the coupling member is constructed as a rack, threaded rod, link chain, toothed belt, V-belt or like element, while the rotating engagement member may be designed complementary to the coupling member in the form of a toothed wheel, threaded wheel (=threaded nut, threaded sleeve) or corresponding turning means, and the motor may be configured as a hydraulic motor, pneumatic motor or, preferably, electrical motor. As the motors are secured directly to the two outer support columns and are operatively connected to the coupling member (rack, threaded rod), which is stationary, i.e. fastened to the frame, by way of the rotating engagement member (pinion, threaded sleeve), the machine can be made of comparatively short overall design since no rotatable threaded spindles or hydraulic pistons project laterally out of the machine, not even when the outer blow mold halves are moved right up to the outer edge of the machine. For smaller machines, a preferably laterally arranged motor with associated laterally arranged rack or threaded rod is sufficient for each outer blow mold half; in the case of larger blow molding machine, each outer support column carrying a mold support plate can be respectively equipped with two drive units arranged in a parallel disposition. It is thus possible for the two racks or threaded rods to be arranged and fastened directly beside or on the slide rails or guide rods of the support columns. In this case, too, when the machine is equipped with four motors (preferably electric motors), the synchronization of the movement sequences can be effected preferably e.g. by way of a master/slave control, with a master motor receiving the control pulses and the other slave motors simultaneously executing the corresponding functional sequences.

The coupling member of one outer support column is advantageously arranged in axial prolongation of or in alignment with the coupling member of the opposite support column of the other outer blow mold half, with the threaded rods being of continuous single-piece configuration or made of a plurality of pieces.

According to another feature of the present invention, the drive motor may be constructed as a spindle motor having a toothed wheel or pinion seated on the motor shaft for interaction with a threaded sleeve mounted rotatably on the coupling member in the form of a threaded rod, with the threaded sleeve being rotatably supported in a bearing housing arranged on the respective support column and driven by the toothed wheel from outside by an external toothing.

Preferably, the drive motor fastened to one blow mold half or to a support column carrying one blow mold half is constructed as an electric hollow-shaft motor with the coupling member coinciding in the form of a thread rod fixed to the housing with the motor axis, with a driven threaded sleeve of the motor being rotatably supported by the threaded rod. The hollow-shaft motor or hollow-shaft motors may certainly also be hydraulically or pneumatically driven; however, an electric hollow-shaft motor can be made of considerably smaller design since the rotatable threaded sleeve forms part of the rotatable armature or is directly connected thereto.

Arranged between two blow mold halves is a loosely displaceable blow mandrel device (without any positive-locking coupling), optionally with a spreading or/and turning-out device. The blow mandrel device is equipped with its own holding device so as to enable to lock or secure the blow mandrel device between the two respectively open blow mold halves exactly below the tube extrusion die. In a further development of the invention, it is also possible to provide the blow mandrel device with its own drive. The lower end of the tube can then be guided by means of the movable blow mandrel device, for example when closing the blow mold halves. Moreover, the blow mandrel device can be moved to any desired position between the open blow mandrel halves and secured in place. This is a significant advantage, e.g. for production of technical or asymmetrical parts. Suitably, the drive of the blow mandrel device is also designed as an electric hollow-shaft motor having a rotatable threaded sleeve arranged on the same threaded rod as the hollow-shaft motors of the outer support columns.

In conjunction with a two-station machine, only the two outer support columns are equipped with a drive unit, while a central support column without any drive of its own is so guided as to freely move on the frame and is provided with only one central mold support plate which carries on both sides a respective blow mold half. By way of the separate mold locking system, the central support column with the two central blow mold halves is capable of being coupled to the right or left outer blow mold half and displaced therewith so that the provision of a separate drive is not needed.

The blow molding machine according to the present invention can be adapted for use as a machine with three, four or more stations, without necessitating any further drive units for the central support columns. In such a multi-station machine, again only the two outer support columns are each equipped with a drive unit, while the plurality of central support columns are so guided as to be freely displaceable on the frame, in the same way, without any drive of their own and provided with only one mold support plate carrying on both sides a respective blow mold half. A displacement of the central support columns with each carrying two blow mold halves is also effected via a coupling to a respective outer support column provided with its own drive, by means of the mold-locking systems which are operated separately.

The blow molding machine according to the present invention stands out by virtue of the following advantages:

entire system free from play, no hydraulic system (hydraulic tank, hydraulic conduits, hydraulic pressure pump, oil), absolutely quiet and vibrationless operation of the transport device, control of all motors for the support columns by means of a simple master-slave system, in the case of a multi-station machine (two, three, four or more stations), always only the two outer blow mold halves or the associated support columns need to be equipped with a drive (electric spindle motor), with the inner blow mold halves, or blow mold halves located therebetween, being moved conjointly by the outer driven blow mold halves by a linkage via the separate blow mold locking system.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Throughout all the Figures, the same or corresponding elements are generally indicated by the same reference numerals.

Figure 1:
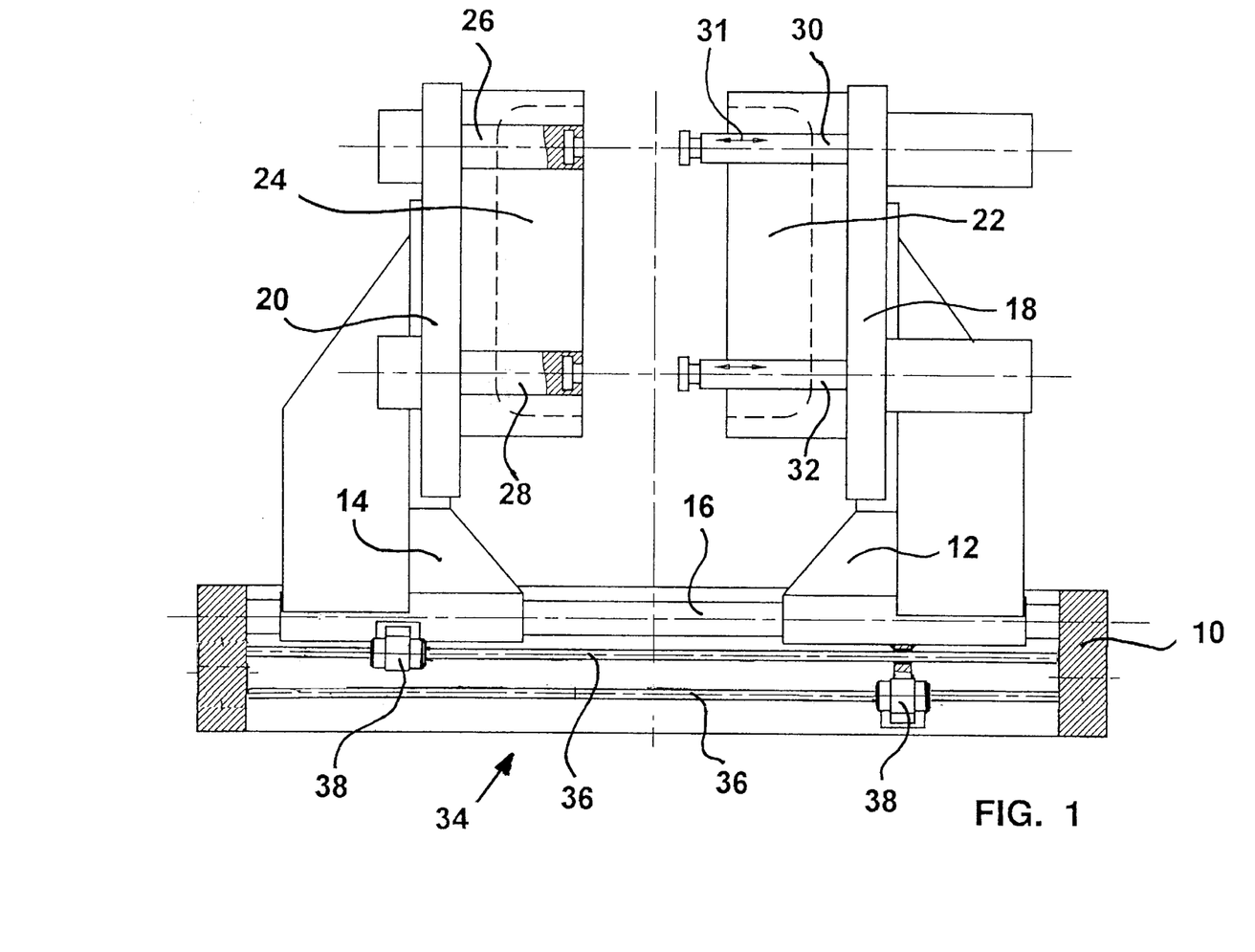
FIG. 1 shows a side view of one embodiment of a single-station blow molding machine according to the invention.

Turning now to the drawing, and in particular to FIG. 1, there is shown a side view of one embodiment of a single-station blow molding machine according to the present invention, including a flat base frame 10 on which two support columns 12, 14 are mounted for horizontal displacement on two parallel cylindrical rods 16 or slide rails. The support columns 12, 14 carry each a mold support plate 18, 20 for support of the respective blow mold halves 22, 24 such that the blow mold halves 22, 24 can be quickly detached. Positioned laterally next to the blow mold halves 22, 24 is a locking unit including upper and lower stationary locking members 26, 28 secured to the support plate 20 next to the mold half 24 and in opposition thereto complementary upper and lower hydraulically displaceable clamping members 30, 32 secured to the support plate 18 next to the mold half 22 and movable in axial direction as indicated by arrow 31. The locking unit for the blow mold halves 22, 24 is preferably so constructed as to be completely independent from the drive of a transport device, generally designated by reference numeral 34 for moving the support plates 18, 20, as will be described hereinafter. The locking unit includes two or (as shown) four short-stroke hydraulic cylinders (with a stroke of about 50 mm), depending on the size of the blow mold and of the hollow body to be blown. An advantageous, closed system of forces (polygon of forces) exists within the locking system. The form-fit of the locking system is effected substantially in the mold parting plane so that when the blowing mold is open there are no locking elements projecting obstructively into the clearance and hindering, for example, the removal of an article.

The transport device 34 for a rapid to-and-fro movement (quick tranverse) of the blow mold halves is arranged below the support columns 12, 14 in the frame 10 and includes at least two separate identical drive units that operate independently from one another, with the outer support columns 12, 14 which carry the mold support plates 18, 20 being equipped with at least one of these drive units.

According to a preferred embodiment, each of the drive units includes a coupling member 36 in the form of a stationary, fixed threaded rod (not a rotatable threaded spindle!) which is securely fixed to the base frame 10, and a motor 38, e.g. an electric hollow-shaft motor, which is mounted to the respective outer support column 12, 14 for conjoint movement and has incorporated therein an engagement member in the form of a rotatably supported threaded nut placed in form-fitting manner on the threaded rod 36 to effect a displacement of the motor 38.

As shown in FIG. 1, the coupling members 36 (here threaded rods) can be arranged in the frame 10 one below the other i.e. in two planes. In the case of smaller machines, the coupling members may be offset laterally rearwardly to thereby create more space for a blow mandrel device.

Figure 2:
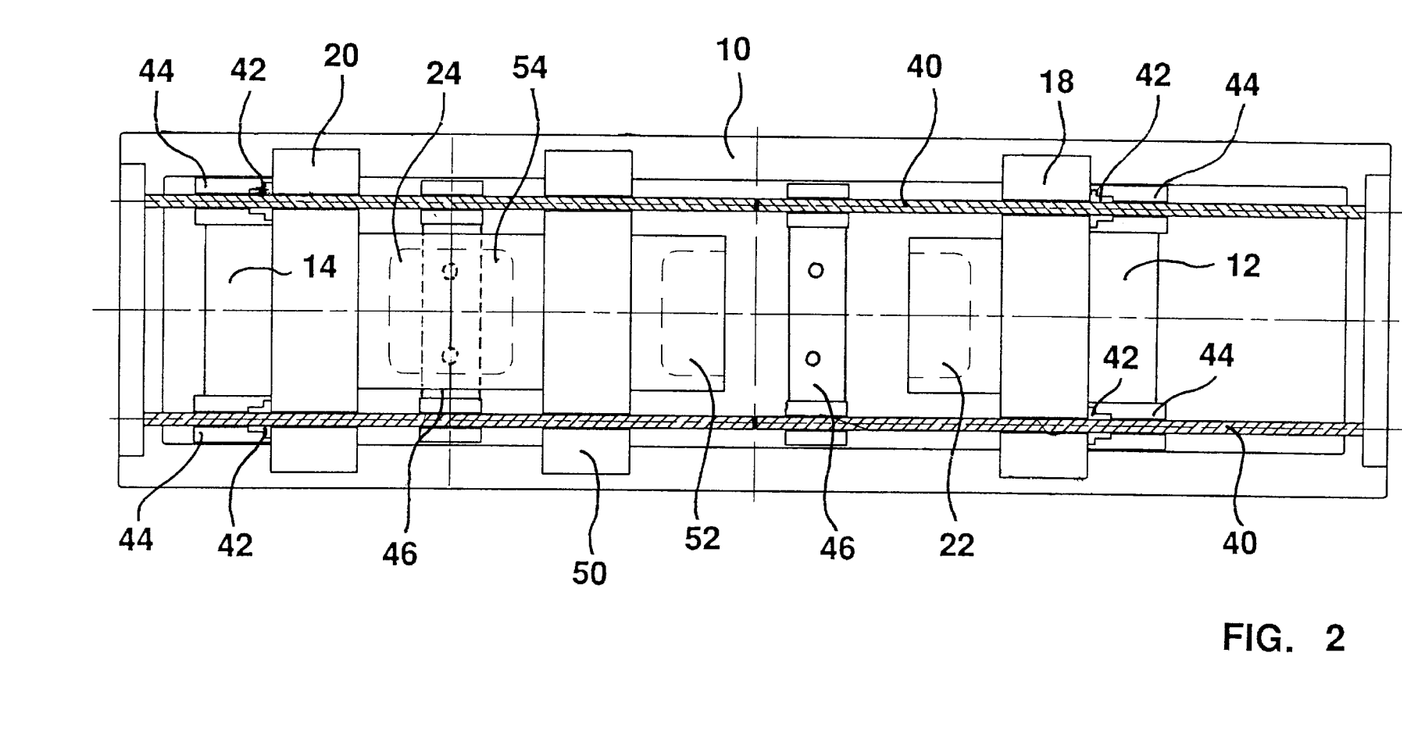
FIG. 2 shows a plan view of one embodiment of a two-station blow molding machine according to the invention.

FIG. 2 shows a two-station blow molding machine according to the present invention shown in FIG. 2, with a first (left) station including the two blow mold halves 24 and 54, the blow mandrel device 46 located therebelow, the two mold support plates 20 and 50, and also the outer support column 14 carrying the mold support plate 20 and the central support column (not shown in the drawing), on which the central mold support plate 50 is mounted. A second (right) station includes in like manner the two blow mold halves 22 and 52, the blow mandrel device 46 located therebelow, the two mold support plates 18 and 50, and also the outer support column 12 carrying the mold support plate 18 and again a central support column (not shown), which carries the central mold support plate 50. The central mold support plate 50, which is part of both stations, supports on both sides a respective blow mold half 54, 52. The blow mold half 54 constitutes the right blow mold half of the left station, and the blow mold half 52 constitutes the left blow mold half of the right station.

In this configuration, only the two outer support columns 12, 14 are each equipped with a drive unit, with each drive unit including two electric hollow-shaft motors 44 which are arranged in parallel disposition and are each provided with a rotatable threaded nut 42. As shown in FIG. 2, the threaded nuts 42 are respectively placed upon two threaded rods 40 which are secured in parallel disposition to the frame 10. In the nonlimiting example of FIG. 2, the parallel threaded rods 40 are each arranged laterally in the frame 10 in one plane such that sufficient space is available for a blow mandrel device 46 with spreading and turning-out unit. In the case of smaller or one-station machines, the coupling member may be formed by a one-piece continuous threaded rod or rack, while in the case of longer or multi-station machines, the coupling member runs on both longitudinal sides of the frame 10 and is suitably formed by a plurality of aligned pieces (threaded rods, racks, etc.).

In operation, a tubular parison of thermoplastic material is extruded e.g. between the open blow mold halves 52, 22 of the right station, with the lower end of the parison being lowered toward the blow mandrel device 46 in spread-apart configuration. The blow mold halves 52, 22 are now moved together and closed. This is effected for the right blow mold half 22 by means of the two hollow-shaft motors 44 fastened to the support column 12 and having threaded sleeves 42, and for the left blow mold half 52 by means of the two hollow-shaft motors 44 fastened to the support column 14 and having threaded sleeves 42. The two blow mold halves 24, 54 of the left station are, at this point in time, closed or locked and clamped by means of the respective locking unit. The blow mandrel device 46 clamped therebetween is, as described above, freely displaceable therewith and can be locked or arrested at any position by means of its own brake or holding device which will be described in more detail furtherbelow with reference to FIGS. 6a and 6b. When the blow mold halves 52, 22 of the right station is closed, the entire linked unit of both stations is moved to the right until the mold parting line and the blow mandrel device 46 are positioned exactly under the extrusion die for the tubular parison. The blow mandrel device 46 is now arrested and the locking device of the two blow mold halves 24, 54 of the left station is then released and opened, and the two blow mold halves 24, 54 are moved apart. The travel of the left blow mold half 24 is effected by means of the two hollow-shaft motors 44 fastened to the support column 14, and of the right blow mold half 54 is effected by means of the two hallow-shaft motors 44 fastened to the support column 12, with the right station being closed or the blow mold halves 52, 22 being locked and coupled by way of their locking device. After the opening of the two blow mold halves 24, 54, the finished article is removed and a new tubular parison is extruded between the blow mold halves. After the closure of the mold, the blow mandrel device 46 is clamped between the mold halves again and the locked state can be released. This sequence is executed in principle in the same way also in conjunction of multi-station machines.

Figure 3:
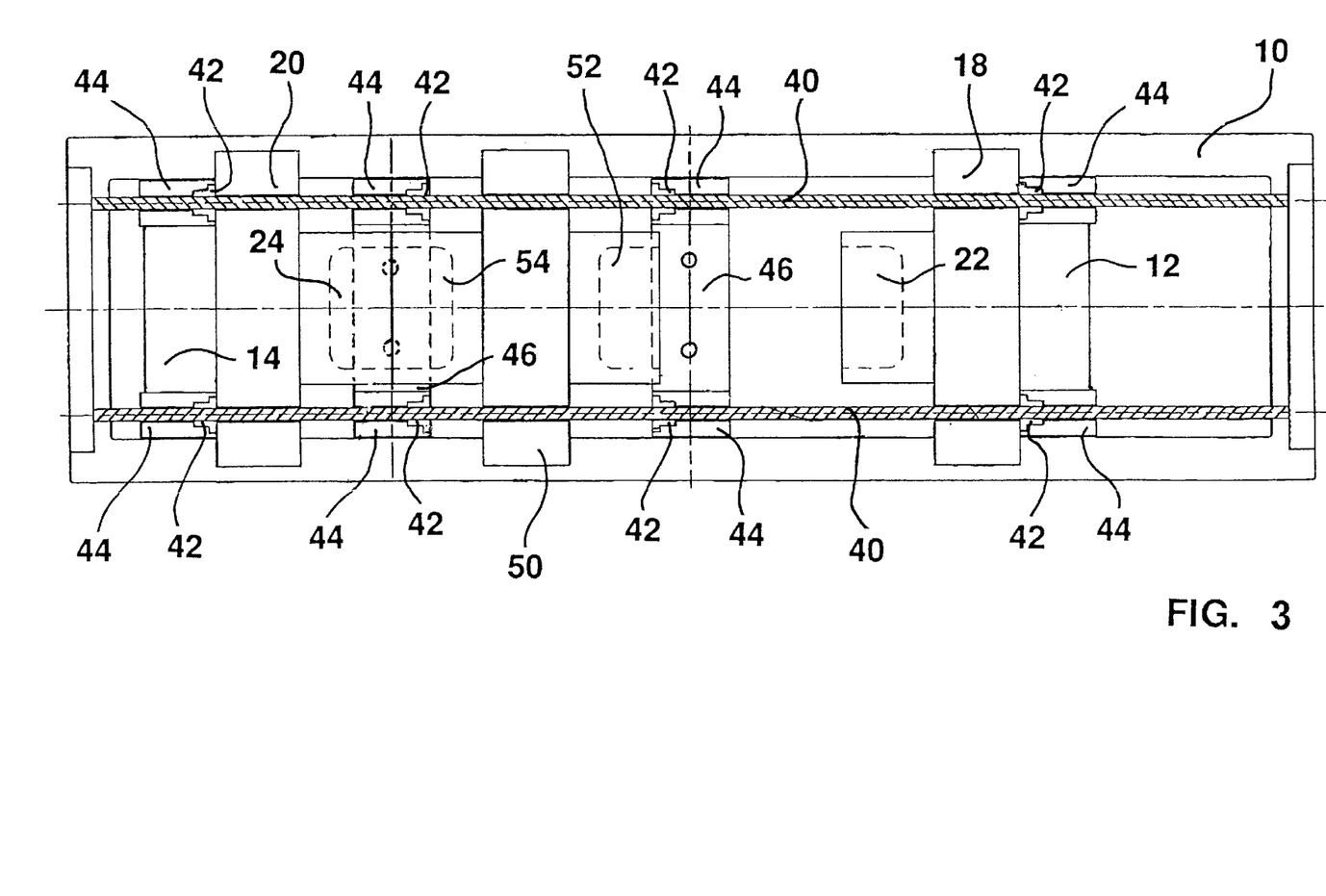
FIG. 3 shows a plan view of a modified embodiment of a two-station blow molding machine according to the invention.

Referring now to FIG. 3, there is shown a modified two-station blow molding machine, with the difference to the embodiment shown in FIG. 2 residing in the equipment of the two blow mandrel devices 46 with one or—in the case of larger machines—with two small electric hollow-shaft motors 44 and positive-locking threaded sleeve 42. As a result, each blow mandrel device 46 is freely movable as desired when the blow mold halves are open. When the blow mold halves are closed or when both stations are moved together, the motors of the blow mandrel devices 46 can either be switched to free-running and be displaced therewith inactively, or act as an additional drive for the entire unit.

As shown in FIG. 3, the blow mandrel device 46 in the right station is shifted with its hollow-shaft motors 44 from the centered middle position right up to the left blow mold half 52. This process variant can—be mentioned—be of particular importance especially for the production of technical or asymmetrical blow moldings.

Figure 4:
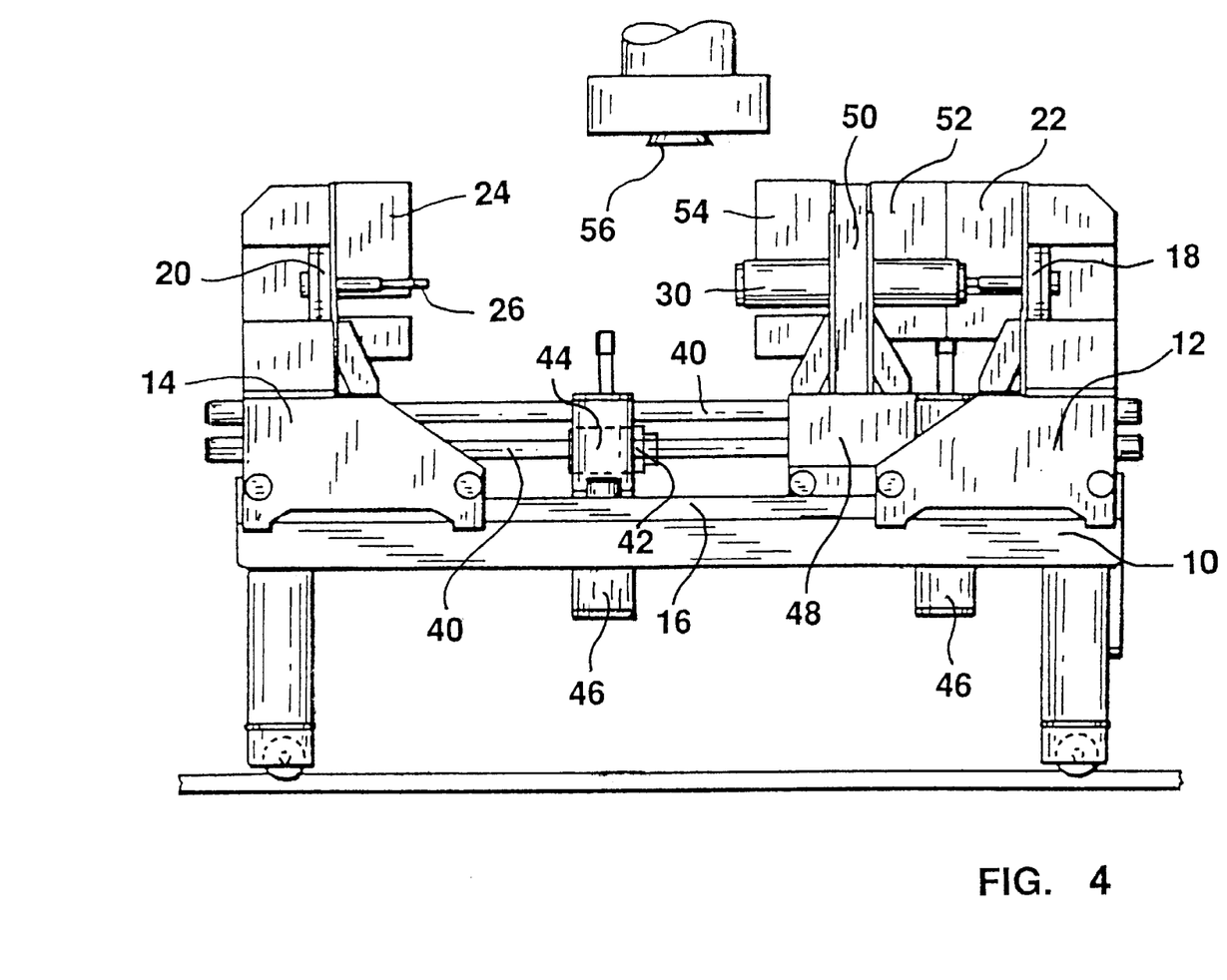
FIG. 4 shows a side view of a two-station blow molding machine according to the invention.

The two-station blow molding machine shown in FIG. 4 clearly illustrates that the open blow mold halves (here 24, 54) can be moved very far apart, i.e. by way of the freely available path length of the threaded rods 40. This is very advantageous, for example, for cleaning purposes, for repair work or for a rapid change of the mold. The blow mandrel device 46 with hollow-shaft motor 44 of the left station is in this case moved to any desired position between the open blow mold halves 24, 54 away from the middle position below the extrusion die 56 for the tubular parison and locked in place. For repair work or a change of mold, for example, it can likewise be very advantageous if the blow mandrel device can be moved out of the way, entirely to one side.

The blow molding machine according to the invention can also be constructed, in the same way as the two-station machines shown in FIGS. 2, 3 or FIG. 4, as a machine with three, four or more stations, in which case likewise only the two outer support columns 12, 14 are each provided with a drive unit, while the plurality of central support columns 48 are constructed to be freely displaceable on the frame 10 by means of the locking system, without any drive of their own and are provided with only one mold support plate 50 which are equipped on both sides with a respective blow mold half 52, 54. Also the blow mandrel devices 46 may likewise be provided with their own drive or hollow-shaft motor.

Figure 5:
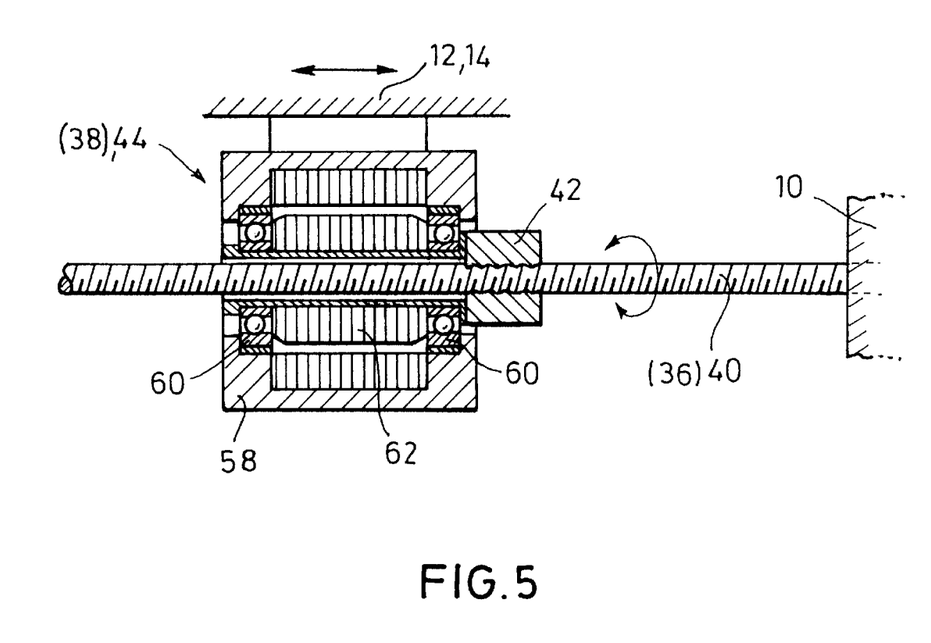
FIG. 5 is a schematic cross sectional view of a hollow-shaft motor for use in a single-station or multi-station blow molding machine.

Turning now to FIG. 5, there is shown a schematic cross sectional view of a preferred embodiment of a hollow-shaft motor 44 for use in a single-station or multi-station blow molding machine according to the present invention. The hollow-shaft motor 44 of each support column 12; 14 has a casing 58 which is secured on top to the associated support column 12; 14. Accommodated within the casing 58 is an armature or rotor 62 which is rotatably supported by ball bearings 60, with the rotatable threaded sleeve 42 being mounted to the rotor 62 at one side thereof and meshing in form-fitting manner with the coupling member 36 in the form of a threaded rod 40, whereby the sleeve 42 is provided with an internal thread and the threaded rod 40 is provided with an external thread. As further shown schematically in FIG. 5, a wire winding or electric coil is accommodated in the casing 58 and placed around the rotor 62.

At operation of the hollow-shaft motor 44, the rotor 62 turns with the sleeve 42 on the threaded rod 40. Depending on the direction of rotation of the rotor 62 and the sleeve 42, the hollow-shaft motor 44 is shifted to the right or left along the threaded rod 40. As the casing 58 of the hollow-shaft motor 44 is secured to the support column, the displacement of the motor 44 results in a conjoint movement of the support column together with the attached blow mold half.

As described above, the blow mandrel device 46 may also be equipped with a separate motor such as a hollow-shaft motor shown in FIG. 5 for displacement along the threaded rod 40.

Figure 6A:
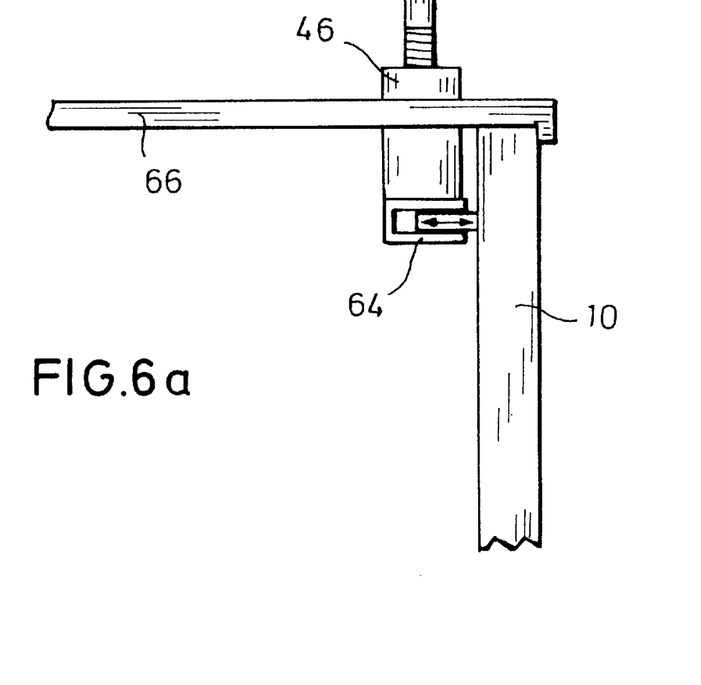
FIG. 6a is a schematic representation of a holding device for use with a blow mandrel device.

FIG. 6*a* shows a schematic representation of a holding or brake device for use with the blow mandrel device 46. As illustrated by way of example in FIG. 6*a*, the holding device may include an electromagnet 64 mounted to the underside of the blow mandrel device 46. When exciting the coil of the electromagnet 64 with electric voltage, the core of the electromagnet 64 travels slightly sideways to attach as a result of a buildup of a magnetic field, e.g. onto the frame 10 of the blow mold machine so as to be locked in place. After removing the electric voltage, the electromagnetic field breaks down to release the core of the electromagnet 64 and to thereby allow a displacement of the blow mandrel device 46. By means of the electromagnet 64, the blow mandrel device 46 can thus be locked in place and released in any desired position.

Persons skilled in the art will understand that the electromagnet 64 may also be mounted to the side of the blow mandrel device so that the core of the electromagnet 64 interacts with a crossbar 66 upon which the blow mandrel device 46 travels.

Figure 6B:
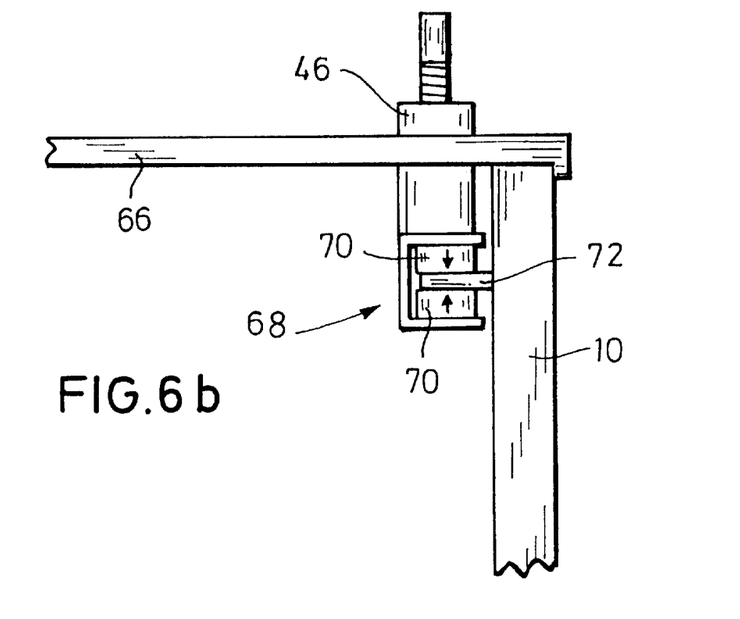
FIG. 6b is a schematic representation of a modified holding device in the form of a brake unit for use with a blow mandrel device.

FIG. 6*b* shows a modified brake-type holding device in the form of a typical motor vehicle disk brake, generally designated by reference numeral 68, as used for example for each wheel of a passenger car. The disk brake 68 includes two brake pads 70 which are pressed against a thin longitudinal rail 72 (brake rail) positioned between the brake pads 70 and secured to the base frame 10 of the blow mold machine. This type of disk brake is generally available and allows a locking of the blow mandrel device 46 at any position within the base frame 10 of the blow mold machine. Instead of hydraulic operation, persons skilled in the art will understand that the actuator of such a brake unit may also be operated pneumatically or by means of a small electromotor.

While the invention has been illustrated and described as embodied in a blow molding machine, it is not intended to be limited to the details shown since various modifications and structural changes may be made without departing in any way from the spirit of the present invention.

What is claimed as new and desired to be protected by Letters Patent is set forth in the appended claims:

1. A blow molding machine having a base frame (10) without tie bars for the production of blow molded hollow plastic bodies, in which two blow mold halves (22, 24) for receiving the tubular parison are constructed to be horizontally displaceable by means of a transport device (34) acting on mold support plates (18, 20) or an associated support columns (12, 14) carrying the mold support plates (18, 20), and which has an independent separate locking system acting on the mold support plates (18, 20) and having its own drive for pinching off the tubular parison and for locking the blow mold halves (22, 24) during blow molding operation, characterized in that the blow mold halves (22, 24) are free from any direct, positive-locking coupling by way of a mechanical synchronizing device and the transport device (34) comprises at least two separate drive units independent of one another and of the same type, with each outer mold support plate (19, 20) or each outer support column (12, 14) carrying a mold support plate (18, 20) being equipped with at least one of these drive units.

2. The machine of claim 1 wherein the drive unit includes a coupling means (36) fixed to the housing and a motor (39) fastened to the respective outer support column (12, 14) and displaceable therewith, which motor is operatively connected directly to the stationary coupling means by way of a rotating engagement member.

3. The machine of claim 2 wherein the coupling means (36) is constructed as a rack, threaded rod (40), link chain, toothed belt, V-belt or corresponding means, and the rotating engagement member is constructed as a toothed wheel, threaded wheel (42) or corresponding turning means, and the motor (38) is constructed as a hydraulically driven motor, as a pneumatically driven motor or preferably as an electrically driven motor (44).

4. The machine of claim 2 wherein the motor (36) of each driven unit is fastened to the outer mold support plate (19, 20) or the outer support column (12, 14) carrying a mold support plate (18, 20), and the coupling means (36) is fastened to the frame (10) in a manner fixed to the housing.

5. The machine of claim 1 wherein each outer mold support plate (18, 20) or each outer support column (12, 14) carrying a mold support plate (18, 20) is respectively equipped with two drive units in parallel disposition.

6. The machine of claim 2 wherein the coupling means (36) of a mold support plate (18, 20) or of a support column (12, 14) of one blow mold half (22, 24) is arranged in axial prolongation of or in alignment with the opposite coupling means (36) of a mold support plate (18, 20) or of a support column (12, 14) of another blow mold half (22; 24).

7. The machine of claim 1 wherein the drive unit of each mold support plate (18, 20) or of each support column (12, 14) is operatively connected in a positive-locking manner to at least one common coupling means (36) in the form of a continuous single-piece element fixed to the housing.

8. The machine of claim 1 wherein the drive motor (38) is constructed as a spindle motor with a threaded sleeve (42) driven from outside which is rotatably mounted on the coupling means (36) in the form of a threaded rod (40).

9. The machine of claim 8 wherein the threaded sleeve is formed with an external toothing.

10. The machine of claim 1 wherein the drive motor (38) fastened to a blow mold half (22, 24) or to a support column (12, 14) carrying a blow mold half (22, 24) is constructed as a hollow-shaft motor (44) with a threaded rod (40) fixed to the housing and coinciding with the axis of the motor for rotatable support of a driven threaded sleeve (42) of the motor (44).

11. The machine of claim 1, and further comprising a loosely displaceable blow mandrel device (46) (without any positive-locking coupling) positioned between two blow mold halves (22, 24) and provided, optionally, with a spreading or/and turning-out device.

12. The machine of claim 11 wherein the blow mandrel device (46) is provided with its own drive.

13. The machine of claim 12 wherein the drive of the blow mandrel device (46) is likewise constructed as an electric hollow-shaft motor (44) having a rotatable threaded sleeve (42) arranged on the same threaded rod (40) as the drives of the blow mold halves (22, 24) or of the corresponding support columns (12, 14).

14. The machine of claim 11 wherein the blow mandrel device (46) is equipped with its own holding device.

15. The machine of claim 1 in the form of a two-station machine, in which only the two outer support columns (12, 14) are each equipped with a drive unit, while the central support column (48) is so constructed as to be freely displaceable on the frame without any drive of its own and is provided with only one central mold support plate (50) which is equipped on both sides with a respective blow mold half (52, 54).

16. The machine of claim 1 wherein in a construction as a three-, four- or multi-station machine, in which only the two outer support columns (12, 14) are each equipped with a drive unit, while the plurality of central support columns (48) are so constructed as to be freely displaceable on the frame without any drive of their own and are provided with only one mold support plate (50) which are equipped on both sides with a respective blow mold half (52, 54).

17. A blow molding machine, comprising:
a frame;
a blow mold adapted for receiving a tubular parison and having a first mold support plate for support of one mold half and a second mold support plate for support of another mold half;
a transport unit mounted to the base frame and operatively connected to the blow mold, said transport unit including a first drive for movement of the first support plate and a second drive for movement of the second support plate independent of the first drive so as to allow displacement of the blow mold halves independently from one another; and
a locking mechanism secured to the support plates for pinching off the tubular parison and clamping the mold halves during the blow molding operation.

18. The machine of claim 17 wherein the blow mold has a first support columns for carrying the first mold support plate and a second support column for support of the second mold support plate, said first drive including a first coupling member secured to the frame and a first motor mounted to the first support column and displaceable with respect to the first coupling member by means of a first rotating engagement element, and said second drive including a second coupling member secured to the frame and a second motor mounted to the second support column and displaceable with respect to the second coupling member by means of a second rotating engagement member.

19. The machine of claim 18 wherein each of the first and second coupling members is an element selected from the group consisting of rack, threaded rod, link chain, toothed belt, V-belt, and variations thereof, wherein each of the first and second rotating engagement members is an element selected from the group consisting of toothed wheel, threaded wheel, and other turning members, and wherein each of the first and second motors is an element selected from the group consisting of hydraulic motor, pneumatic motor, and electric motor.

20. The machine of claim 18 wherein the first and second drives are arranged in parallel disposition.

21. The machine of claim 18 wherein the first and second coupling members are aligned with one another.

22. The machine of claim 18 wherein the first and second coupling members are each of one-piece design in form-fitting engagement with the first and second drives.

23. The machine of claim 18 wherein each of the first and second motors is designed as spindle motor having a threaded sleeve actuated from outside and rotatably mounted on the pertaining coupling member.

24. The machine of claim 23 wherein the threaded sleeve is formed with an external gear section, said coupling member being a threaded rod for meshed engagement with the gear section of the threaded sleeve.

25. The machine of claim 18 wherein each of the first and second motors is designed as hollow-shaft motor having a threaded rod in alignment with a motor axis, and a driven threaded sleeve rotatably mounted on the threaded rod.

26. The machine of claim 17, and further comprising a loosely displaceable blow mandrel device positioned between the mold halves.

27. The machine of claim 26 wherein the blow mandrel device is provided with a spreading or/and turning-out unit.

28. The machine of claim 26 wherein the blow mandrel device is provided with a separate drive.

29. The machine of claim 28 wherein the drive of the blow mandrel device is constructed as electric hollow-shaft motor having a rotatable threaded sleeve and arranged on a same threaded rod as the first and second motors of the blow mold halves.

30. The machine of claim 26 wherein the blow mandrel device has a separate holding device.

31. The machine of claim 17 in the form of a multi-station machine, said first and second support plates representing outermost support plates, and further comprising at least one central support column without separate drive and freely movable on the base frame, said support column carrying a central support plate equipped on both sides with a blow mold half.

32. The machine of claim 17 wherein the transport unit includes a pair of coupling members secured to the frame, with the first drive having engagement means for so interacting with one of the coupling members as to enable a conjoint displacement of the first drive and the first support plate, and with the second drive having engagement means for so interacting with the other one of the coupling members as to enable a conjoint displacement of the second drive and the second support plate motor.

33. A blow molding machine, comprising:

a frame;

a pair of outer support plates mounted to the frame, each carrying a blow mold half;

at least one inner support plate mounted to the frame and carrying on one side a blow mold half for interaction with the blow mold half of one of the outer support plates an don the other side a blow mold half for interaction with the blow mold half of the other one of the outer support plates;

a drive mechanism so operatively connected to the outer support plates as to allow a displacement of the outer support plates independently from one another while the inner support plate is freely movable on the frame; and a locking mechanism provided between the inner support plate and the outer support plates for effecting a displacement of the inner support plate with respect to the outer support plates independent from a displacement of the outer support plates.

* * * * *